Feb. 10, 1970  E. LIETZ  3,495,197

SWITCHING MEANS FOR AUXILIARY POWER SUPPLY

Filed Jan. 29, 1968  2 Sheets-Sheet 1

INVENTOR
Erich Lietz

BY

ATTORNEY

# United States Patent Office 3,495,197
Patented Feb. 10, 1970

3,495,197
SWITCHING MEANS FOR AUXILIARY POWER SUPPLY
Erich Lietz, 242 Beverly Road, Huntington Station, N.Y. 11746
Filed Jan. 29, 1968, Ser. No. 701,256
Int. Cl. H01h 75/00, 83/00
U.S. Cl. 335—6   7 Claims

ABSTRACT OF THE DISCLOSURE

A system for switching on an auxiliary power supply when there is failure of the main supply. A normally deenergized solenoid activates a double pole double throw switch which starts an auxiliary generator to maintain potential to the load. When the main power is restored, the auxiliary supply is again cut off.

---

Two sources of electrical supply are often provided for communications networks, buildings and other applications where a high degree of service reliability is required. The load is normally connected to a main, or primary, source of supply, and a circuit interrupter is arranged to disconnect the load from this preferred source of supply if it should fail for any reason, and to automatically connect the load to the second or emergency source of supply. When the condition, which caused the preferred source of supply to fail has been remedied and voltage restored thereto, the circuit interrupter is arranged to automatically switch the load circuit from the emergency source back to the preferred source.

While prior art systems have attempted to accomplish these desired results, they have, on the other hand, had many drawbacks, one of the most prevalent being the delay before the auxiliary source can come up to power. Particularly in communications systems such delays cannot be tolerated and, therefore, the stoppage interval has to be bridged over in some way or other. This problem has been solved in the past by the aid of converters which convert the direct current supply from a storage battery into alternating current power which is then supplied to the load until the auxiliary power has had time to take over.

It has also been proposed to employ an asynchronous machine continuously connected to the load and which in normal, that is uninterrupted service, operates as a motor which rotates a flywheel serving as an energy storage device. In case of a failure of the network supply this asynchronous machine will operate as a generator energized by capacitors, the kinetic energy stored in the flywheel being converted into electrical energy which is supplied to the load. This system suffers from the disadvantage that the frequency of the alternating current delivered varies with the rotational speed of the flywheel, and that it is possible only by the aid of complicated auxiliary equipment to maintain the voltage constant.

The present invention offers a vast improvement over all of these prior art devices in that it provides a reliable, sensitive, and rapidly-acting system which unfailingly connects into the circuit an auxiliary source of potential with a minimum time delay and with a minimum number of relays and solenoids. The system requires no separate converters or asynchronously operating machines and its operation can be depended upon under the most adverse conditions to apply the auxiliary power source to the load. It is, accordingly, an object of the present invention to obviate or alleviate the deficiencies of the prior art, such as indicated above.

Another object of the present invention is the provision of a switching means for an auxiliary power supply.

Another object is the provision of an inexpensive switching means which requires a minimum number of relays and solenoids.

Still another objects is the provision of a switching means which has a momentum link for rapid switching and elimination of delay in the application of the auxiliary power.

Yet another object is the provision of a switching means which eliminates contact points and utilizes self cleaning, sliding, knife blade contacts.

Another object is the provision of a switching means which automatically returns the load back to the primary power source as soon as this primary power source is back in operation.

Still another object is the provision of a switching means which does not utilize separate power converters or asynchronously operating machines.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
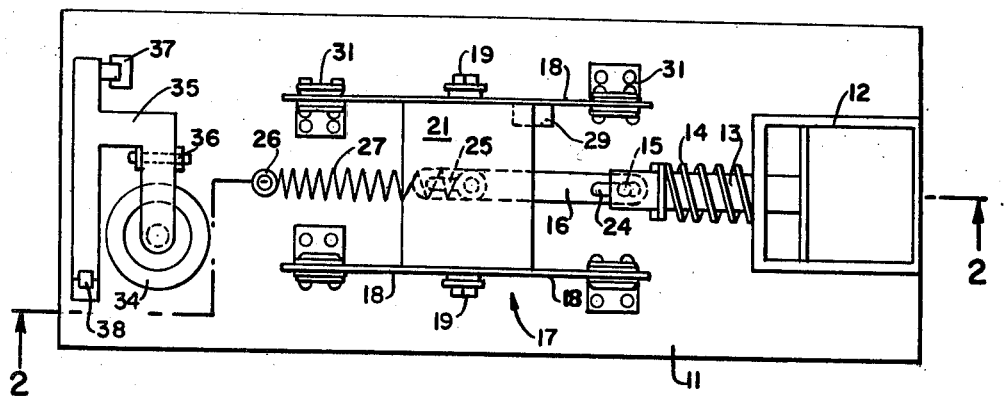
FIG. 1 shows a plan view of the invention.
Figure 2:
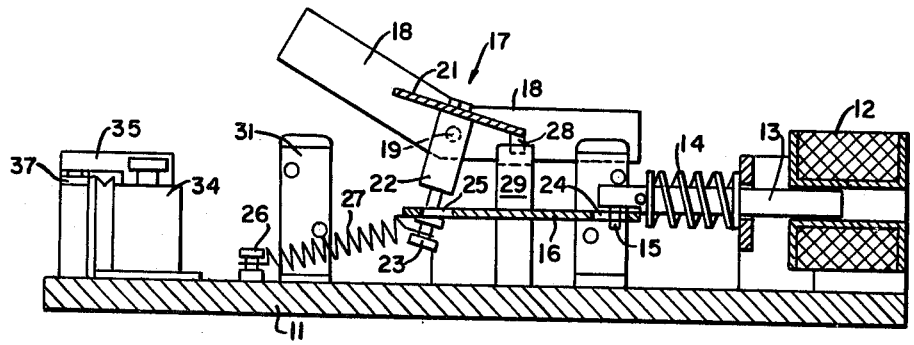
FIG. 2 shows a side elevation view, taken along line 2—2 of FIG. 1 with the switch in position to connect the primary power source to a load.
Figure 3:
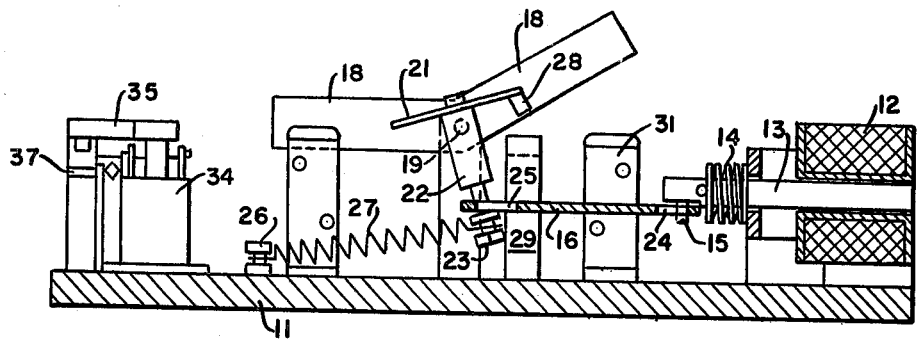
FIG. 3 shows a side elevation view, taken along line 2—2 of FIG. 1, but with the switch in position to connect the auxiliary power source to a load.
Figure 5:
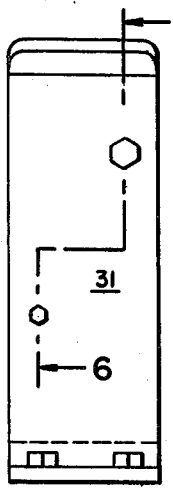
FIG. 5 shows an enlarged elevation view of one of the knife blade switches.

Referring now to the drawings there is shown in FIGS. 1-3 a base plate 11 which forms the foundation for the switching means, the base plate 11 having mounted at one end thereof a solenoid 12, the solenoid, in turn, having a plunger 13 about which is coiled a resilient means 14, such as a spring, or the like. At the outward end of plunger 13 there is a short projection 15 which is used as a connection with a link 16 which is utilized to activate a double pole, double throw switch 17, the switch 17 preferably taking the form of a knife blade switch and having a plurality of blades 18.

Figure 6:
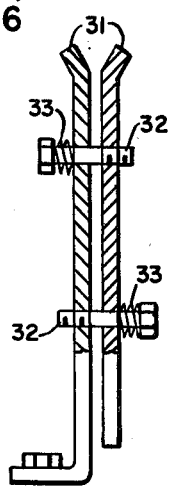
FIG. 6 is a view taken along line 6—6 of FIG. 5 showing the resilient plates forming a part of the knife blade switch.
Figure 7:
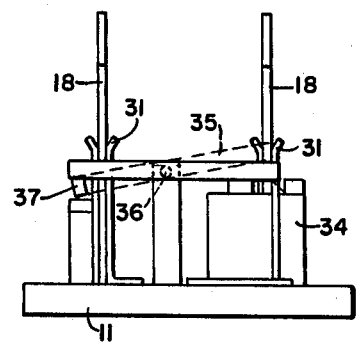
FIG. 7 is an end view showing the relay and two positions of its contact bar.

Knife blade switch 17 is constructed to be pivoted at its center point and, therefore, pivot bolts 19 are provided for this purpose. Integrally attached to the knife blades 18 is a structural member 21, positioned to hold the plurality of blades in rigid relationship, so that both sets of the double poles operate together as they pivot about pivot bolts 19. Attached to, and forming a part of structural member 21 is a downwardly extending arm 22 having an adjustable, doubleheaded screw 23 mounted in its end, which is used, among other things, as an attachment means for link 16. It can be observed in FIGS. 1, 2 and 3 that link 16 has an elongated slot in each of its ends; slot 24 for receiving projection 15 and slot 25 for receiving screw 23. This feature is designed to enhance the speed and certainty of operation of the switch, as will be more fully described hereinafter. Also attached to screw 23, and to an anchoring bolt 26, is a tension spring 27, which when in its normal position (FIG. 2) is used to hold knife switch 17 in contact with the primary source of power. At one side of structural member 21, and depending downward therefrom is a small knife contact 28 which is located to make electrical contact with a fixed contact 29, as shown in FIG. 2. To complete the double pole, double throw switch 17 there are four fixed, vertically extending contacts 31 which mate with knife blades 18 for electrical continuity, the contacts actually being formed of two metallic plates that are capable of slight movement with respect to each other. Referring to FIG. 6 it will be seen that each plate has a screw 32 which passes loosely through one plate and is screwed into the other. Around the shank of the screw and held between the head of the screw and the plate face is placed a spiral spring 33. Thus it can be seen that by this expedient the two plates are resiliently movable with respect to each other so that when the knife blade 18 is forced between them they grip the blade slightly, providing a wiping, cleaning action which removes dirt, oil, and corrosion to improve the electrical conductivity of the switch.

Figure 8:
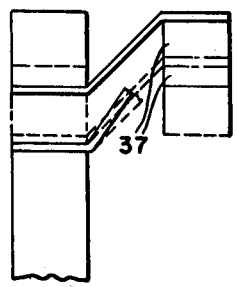
FIG. 8 shows one set of relay contacts in their open and closed positions.
Figure 9:
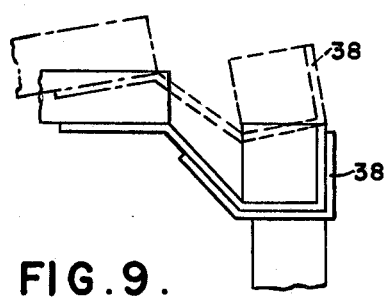
FIG. 9 shows another set of relay contacts in their open and closed positions.

At the opposite end of base plate 11 from solenoid 12 there is located a relay 34, having an L-shaped arm 35 which is pivoted about a bolt 36. On either side of pivot 36, at the ends of arm 35, there are electrical contacts 37 and 38, contact 37 being normally open and contact 38 being normally closed, as will be explained hereinafter. It should be observed from FIGS. 8 and 9 that contacts 37 and 38, by their particular structure and configuration give a wiping, sliding action between the two mating parts, when they are opened and closed, providing a corrosion-free contact, as with the knife blade switch 17.

Figure 4:
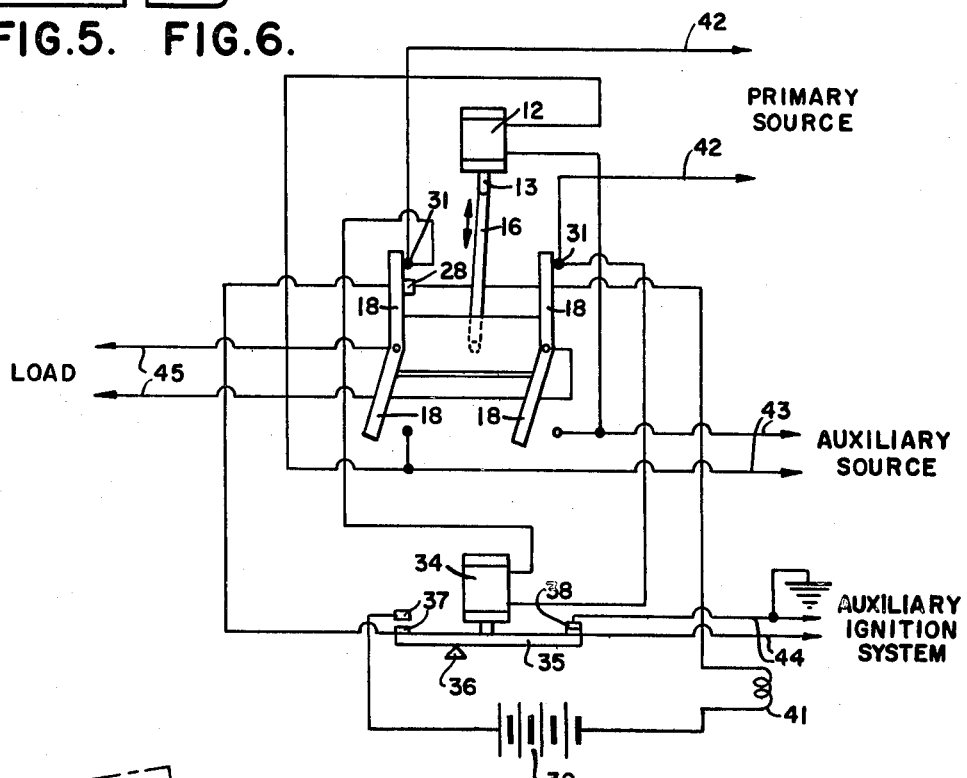
FIG. 4 shows a wiring diagram of the invention.

Turning now to the operation of the invention, and with particular attention to FIG. 4, it can be seen that power is normally supplied by a primary source of some kind (not shown), over primary leads 42, and that the potential passes along these leads thru contact plates 31, along knife blades 18, out the pivot bolts 19, and along output leads 45 to some manner of load (not shown) whose continued operation is imperative. At the same time this is occurring, current is also passing from contacts 31, along leads to the coil of relay 34 so that this relay is always energized, thereby maintaining contact points 37 open and contact points 38 closed. The closing of contacts 38 ground the leads 44 and therefore ground the ignition system of an auxiliary power source (not shown).

Now assume that the primary power source fails and potential goes off leads 42. This will deenergize relay 34, causing its arm 35 to pivot about bolt 36 so that contacts 37 now close and contacts 38 open. The opening of contacts 38 removes the ground from the ignition system of the auxiliary power source, which in this case may be a gasoline or diesel driven generator, for example. The closing of contacts 17 now applies potential from a starting battery 39, through contacts 37, through small knife switch 28, through fixed contact 29, through a starter coil 41, back to battery 39. Energizing starter coil 41 now starts the auxiliary generator and current begins to flow into leads 43. When this happens solenoid 12 is energized since it is connected across leads 43. When solenoid 12 is activated it pulls in armature 13 compressing spiral spring 14, and through its connection with link 16 and against the pull of spring 27 it pivots the double pole double throw knife switch 17 about its pivot bolts 19 to connect the other set of blades 18 with the other set of fixed contacts 31. By this operation auxiliary power is applied directly from leads 43 to the load via leads 45, and due to the loose connections of projection 15 sliding in slot 24 and screw 23 sliding in slot 25, the action of the solenoid imparts an impressed momentum to the link 16 causing the switch to reverse almost instantaneously so that there is a minimum of delay in applying the auxiliary power to the load. When knife switch 17 reverses position it breaks the contact between small switch 28 and its fixed contact 29, thereby disconnecting battery 39 from starter coil 41.

Once service is restored to the primary source, and potential reappears on leads 42, the system will automatically reverse and cut off the auxiliary supply. This occurs when relay 34 is reenergized by the primary source and in so doing moves armature 35 to reopen contacts 37 and reclose contacts 38. The reclosing of contacts 38 grounds the ignition of the auxiliary source cutting it off, and this in turn deenergizes solenoid 12 so that springs 27 and 14 cause the knife switch to reverse thereby applying primary source potential to the load again. Reversing of the knife switch 17 also re-establishes contact between the small switch 28 and its contacts 29 so that it will be ready to start the auxiliary power source should the primary source fail again.

From the above description of the structure and operation of the present invention it is obvious that the instant switching means offers a vast improvement over prior auxiliary power systems. The invention assures continual and reliable power to a load through the automatic functioning of a system which requires little or no maintenance, and by the incorporation of the novel lost-motion connection between the solenoid and its link with the knife switch, an added momentum is imparted to the link, resulting in almost instantaneous reversing of the switch with minimum delay. Furthermore, the novel structure of the fixed contacts of the double pole double throw knife switch provides a wiping, sliding action with the switch blade which alleviates corrosion, oil, and foreign matter that could cause faulty operation of the system. The relay contacts likewise have a wiping, spring-like action which insures good electrical contact without arcing.

Obviously many modifications and variations of the present invention are possible in the light of the above teachings. It is therefore to be understood that within the scope of the appended claims, the invention may be practiced otherwise than as specifically described.

What is claimed is:

1. A switching system operative upon the failure of a primary power source to supply a load to provide starting potential from a starting power source to starting means for starting an auxiliary power source and to connect the resultant auxiliary potential to said load comprising first switch contact means adapted to receive potential from said primary power source, second switch contact means adapted to receive potential from said auxiliary power source, first switch means having switch output terminals for connection to said load, said first switch means being adapted to move into engagement with either said first or second switch contact means to provide potential therefrom to said switch output terminals, second switch means movable with said first switch means to complete a circuit to said starting means when said first switch means moves into engagement with said first switch contact means and to break said circuit when said first switch means moves into engagement with said second switch contact means, third switch means connected to receive the potential from said primary power source and operative upon receipt of said primary potential to prevent operation of said auxiliary power source, said third switch means operating upon failure to receive said primary potential to connect said starting power source to said second switch means, and switch operating means connected to receive the potential from said auxiliary power source, said switch operating means being operative upon receipt of said auxiliary potential to move said first switch means into engagement with said second switch contact means.

2. The switching system of claim 1 wherein said first switch means is formed by a double pole, double throw knife blade switch pivoted in the middle.

3. The switching system of claim 2 wherein said first and second switch contact means are each formed by two metal strips which are forced apart by entry of the knife blade switch to give a wiping, squeezing, corrosion-free contact with the switch blade, and mounting means extending between said metal strips to mount one of said strips on the remaining strip, said mounting means including spring biasing means to bias said strips together.

4. The switching system of claim 2 wherein said second switch means includes a secondary switch mounted upon the knife blade switch for movement therewith.

5. The switching system of claim 1 wherein said third switch means includes a relay operated switch having a relay coil connected to receive potential from said first contact means.

6. The switching system of claim 2 wherein said switch operating means includes a single, normally de-energizer solenoid having a solenoid operating arm and a solenoid coil electrically collected to said second contact means, and linkage means extending between said solenoid operating arm and said knife blade switch for pivoting said switch, said linkage means including an elongated link having elongated slots in both ends for providing loose, free moving connection with said knife blade switch and solenoid operating arm, whereby movement by the solenoid imparts added momentum to the movement of the knife blade switch.

7. The switching system of claim 5 wherein said relay operated switch includes a switch arm having a first contact connected to ignition means for said auxiliary power source and a second contact connected to said second switch means, a first stationary contact connected to an electrical ground and positioned to be engaged by said first switch arm contact when said relay operated switch is energized, and a second stationary contact connected to said starting power source and positioned to be engaged by said second switch arm contact when said relay operated switch is deenergized, said switch arm and stationary contacts being formed to approach each other at an angle to produce a wiping action between contacts.

References Cited

UNITED STATES PATENTS

| | | | |
|---|---|---|---|
| 949,844 | 2/1910 | Richmond | 335—126 |
| 1,689,075 | 10/1928 | Lehman | 335—126 |
| 2,606,217 | 8/1952 | Raine | 307—64 |
| 2,745,971 | 5/1956 | Robertson | 307—64 |
| 3,032,627 | 5/1962 | Ronk | 335—187 |

FOREIGN PATENTS 12,701    5/1910    Great Britain.

BERNARD A. GILHEANY, Primary Examiner

H. BROOME, Assistant Examiner

U.S. Cl. X.R.

335—126